United States Patent [19]

Suwa

[11] 4,371,595
[45] Feb. 1, 1983

[54] BATTERY CONTAINING MECHANISM OF A COMPACT ELECTRONIC INSTRUMENT

[75] Inventor: Kaname Suwa, Yokohama, Japan

[73] Assignee: Canon Kabushiki Kaisha, Tokyo, Japan

[21] Appl. No.: 330,016

[22] Filed: Dec. 11, 1981

[30] Foreign Application Priority Data

Dec. 19, 1980 [JP] Japan .................................. 55/180237

[51] Int. Cl.³ ............................................. H01M 2/10
[52] U.S. Cl. ......................................................... 429/98
[58] Field of Search ................................. 429/96–100; 354/80, 81; 368/204

[56] References Cited

U.S. PATENT DOCUMENTS 3,864,172  2/1975  Marks ............................... 429/96 X
4,251,604  2/1981  Umemoto ............................ 429/98

Primary Examiner—Anthony Skapars
Attorney, Agent, or Firm—Fitzpatrick, Cella, Harper & Scinto

[57] ABSTRACT

There is disclosed a battery in which a member biased in a predetermined direction by a spring member is pivotably held on the side of the opening of a battery containing chamber and a battery lid is engaged and held in the opening by this member to thereby fix a battery in the battery containing chamber.

10 Claims, 2 Drawing Figures

BATTERY CONTAINING MECHANISM OF A COMPACT ELECTRONIC INSTRUMENT

BACKGROUND OF THE INVENTION

1. Field of the Invention

This invention relates to a battery containing mechanism of a compact electronic instrument.

2. Description of the Prior Art

Most of the battery containing mechanisms of compact electronic instruments have been of the construction of the type in which a battery lid is fixed to a case body by means of screws or of the type in which a battery lid formed of a plastics material such as ABS resin or the like is placed and slid lid on a body guide portion and fixed by utilizing the resilient deformation of a restraining pawl. The former enables the fixing to be relatively stable, but during replacement of the battery, the use of a tool such as a driver for removing the screws is required and this is very inconvenient. In the latter, the operation force during the mounting or dismounting of the battery lid and the holding force of the battery lid are unstable and for example, those forces readily become weaker due to the abrasion and plastic deformation of the restraining pawl resulting from repeated mounting and dismounting operation and in extreme cases, the mounting becomes impossible or the restraining pawl becomes damaged.

SUMMARY OF THE INVENTION

It is an object of the present invention to provide a battery containing mechanism which readily enables mounting and dismounting of a battery.

It is another object of the present invention to enable a battery to be held always in a constant condition.

It is still another object of the present invention to improve the durability of the described mechanism.

It is yet still another object of the present invention to make the described mechanism compact and thin.

It is further object of the present invention to simplify the construction of the described mechanism.

Other objects will become apparent from the following detailed description when read in conjunction with the accompanying drawings.

DESCRIPTION OF THE PREFERRED EMBODIMENTS

Figure 1:
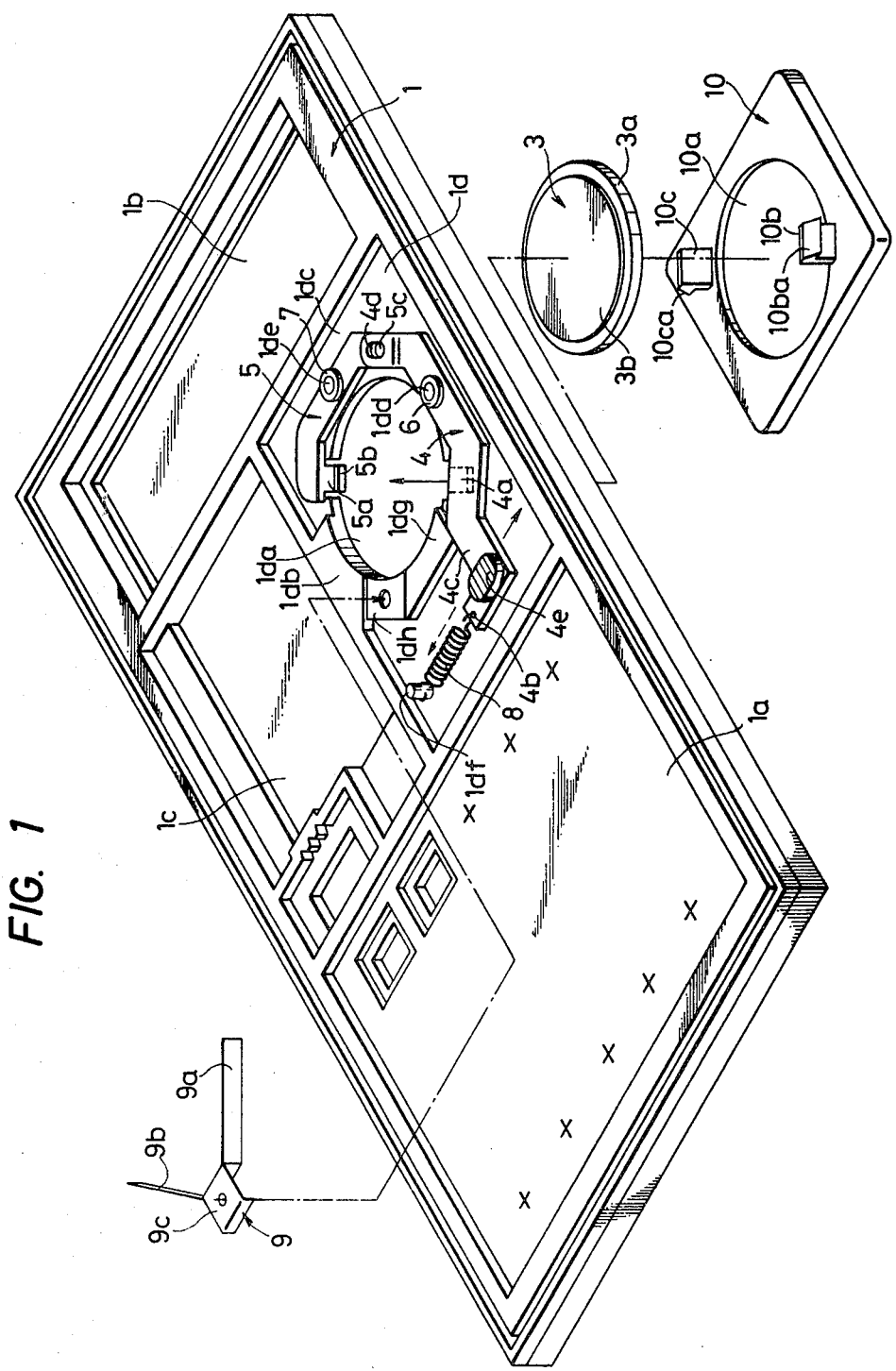
FIG. 1 is a perspective view of an embodiment of the present invention.

FIG. 1 is a perspective view of an embodiment of the present invention. It shows the interior construction of an electronic desk top calculator as seen from the back thereof. In FIG. 1, parts unnecessary for description are omitted, and a printed wiring substrate (not shown) is disposed on the upper surface of an upper case 1 and further, a lower case (not shown) is fitted on the upper surface of the printed wiring substrate and forms the housing case of the electronic desk top calculator with the upper case 1.

The upper case 1 is formed by injection-molding a material such as ABS resin or the like and comprises a keyboard portion 1a on which key tops are disposed, an indicating portion 1b on which an indicator is disposed, a component portion 1c on which electric components such as LSI are disposed, and a battery portion 1d on which a battery is disposed. The battery portion 1d is a base formed with a battery containing hole 1da made slightly larger than the outside diameter of a button type battery 3 such as a lithium battery, a silver oxide battery or a mercury battery to contain the battery 3 in the center thereof, and the battery containing mechanism of the present embodiment is constructed with this base 1d as the base. The base 1d comprises a thick portion 1db and a thin portion 1dc surrounding the containing hole 1da, and shafts 1dd and 1de which provide the centers of rotation of pivotable levers 4 and 5 are projected in the thin portion 1dc. The levers 4 and 5 are fitted to the shafts 1dd and 1de, respectively, and have washers 6 and 7 fitted thereto, and are pivotably held by these shafts in such a manner that they are urged by the lower case as will hereinafter be described.

The levers 4 and 5 may preferably be formed of a material such as Delrin or F.R.P. having a low friction coefficient or a material having a high hardness and a low flexibility.

The levers 4 and 5 are disposed so that the containing hole 1da intervenes therebetween and they are provided with pawl portions 4a and 5a in the portions thereof which face the containing hole 1da, the pawl portions 4a and 5a being engageable with the projections 10b and 10c of a battery lid 10, to be described, to thereby hold the battery lid against the upper case 1. The pawl portions 4a and 5a are respectively formed with inclined surfaces 4b (not shown) and 5b substantially parallel to inclined surfaces formed on the projections 10b and 10c.

One end portion of the lever 4 is formed with a small-diameter hole 4b for hooking thereto one hook portion of a tension coil spring 8. The other hook portion of the coil spring 8 having one hook portion hooked to the small-diameter hole 4b is hooked to the boss 1df of the base 1d to normally pull the end of the lever 4 in the direction of dotted-line arrow with a predetermined force, so that the lever 4 is biased for clockwise rotation about the shaft 1dd. Accordingly, the pawl portion 4a is normally biased toward the center of the hole 1da. Also, the clockwise rotation of the lever 4 is controlled by a stopper 1e provided on the base 1d and, in FIG. 1, a side surface 4c of the lever 4 bears against a stopper portion 1dg. The other end portion of the lever 4 is bent with a step difference substantially corresponding to the thickness of the lever 5, and a slot 4d to be mated by a pin 5c projected from one end portion of the lever 5 is formed in that bent portion. The width and length of the slot 4d are such that the pin 5c of the lever 5 smoothly slides in the entire length of the slot 4d without being rickety. By this connection, the lever 5 is operatively associated with the lever 4 with the shaft 1de as the center, and both the pawl portions 4a and 5a slide substantially radially of the battery containing hole 1da. As shown, the pawl portion 4a of the lever 4 and the pawl portion 5a of the lever 5 are located substantially symmetrically with respect to the hole 1da and the spacing therebetween is set to substantially the same distance as the spacing between the roots of the projections 10b and 10c of the battery lid 10.

A battery contact 9 is mounted at the end of a dots-and-dash line arrow, namely, on the battery contact seat 1dh of the base 1d. The battery contact 9 is formed of an electrically conductive metal material of high spring property by press-working such material and, when it is mounted on the battery contact seat 1dh, the two arms 9a and 9b thereof are positioned along the inner wall of the battery containing hole 1da and, when the button type battery 3 is inserted into the battery containing hole 1da, said two arms contact the ⊕ electrode 3a on the circumference of the battery 3. A printed wiring substrate (not shown) is mounted on the upper surface of the upper case 1 so as to commonly cover the keyboard portion 1a, indicating portion 1b, component portion 1c and base 1d, whereby one face of the containing hole 1da is closed and a battery containing chamber is formed. A ⊖ side circuit pattern is formed at a location on the printed wiring substrate which faces the containing hole 1da, and it contacts the ⊖ side electrode 3b of the battery 3. Also, a ⊕ side circuit pattern which contacts the surface 9c of the battery contact 9 mounted on the contact seat 1dh is formed on the printed wiring substrate and thus, electric power is supplied to various parts soldered onto the printed wiring substrate such as LSI (large scale integrated circuit). From above the printed wiring substrate, as mentioned hereinbefore, a lower case (not shown) is secured to the upper case 1 by means of screws to fix the contained parts such as levers 4, 5, battery contact 9, etc. One surface of the lower case is exposed as the bottom surface of the electronic desk top calculator. Near the small-diameter hole 4b of the lever 4, an operating knob 4e projects and is exposed to the outer surface of the electronic desk top calculator through a hole formed in the lower case, and the surface of the end of the operating knob is knurled to facilitate the operation thereof as by fingers. Designated by 10 is a battery lid having in the center thereof a recess 10a somewhat larger than the battery 3 and having the same shape as the battery. At the diametrically opposite portions of the recess 10a, there are provided projections 10b and 10c which are engageable with the pawl portions 4a and 5a, respectively, of the pivotable levers 4 and 5. On the end portions of the projections 10b and 10c, there are formed inclined surfaces 10ba and 10ca which will bear against the pawl portions 4a and 5a of the pivotable levers 4 and 5 when the battery lid 10 is forced in the direction of dots-and-dash line and will rotate the pivotable levers 4 and 5 so as to open in a direction opposite to the direction of bias by the spring 8.

Description will now be made of the operation of each portion of the battery containing mechanism constructed as described above during the replacement of the battery. When a new battery is to be inserted into the body, the button type battery 3 is inserted in the direction of dots-and-dash line arrow into the battery containing chamber defined by the battery containing hole 1da and the printed wiring substrate, and then forced in to a position in which the ⊖ electrode 3b contacts the ⊖ side circuit pattern of the printed wiring substrate. Thereafter, the battery lid 10 is forced in from the same direction as the battery, and the inclined surfaces 10ba and 10ca of the projections 10b and 10c widen the spacing between the pawl portions 4a and 5a against the force of the tension coil spring 8. The pawl portions 4a and 5a are moved outwardly of the battery containing hole 1da until they ride over the ends of the inclined surfaces of the projections 10b and 10c. Thereafter, the pawl portions are slidingly returned to their original positions by the force of the tension coil spring 8 and the ledge portions at the ends of the pawl portions 4a and 5a come into engagement with the ledge portions lying just beneath the inclined surfaces 10ba and 10ca of the projections 10b and 10c, whereby the battery lid 10 is held on the upper case 1.

When the inserted battery is to be removed, the operating knob 4e exposed outwardly through a hole in the lower case is shifted as by fingers in the direction of solid-line arrow against the force of the tension coil spring 8. The lever 4 pivots counter-clockwise about the shaft 1dd, and the pawl portion 4a which is a part of the lever 4 slides outwardly of the battery containing hole 1da and becomes disengaged from the projection 10b and the slot 4e formed in the end portion of the lever 4 also pivots counter-clockwise about the shaft 1dd, so that the lever 5 receives a force from the pin 5c and pivots clockwise about the shaft 1de. Accordingly, the pawl portion 5a, like the pawl portion 4a, becomes disengaged from the projection 10c and, when it has become completely disengaged, the battery lid 10 can be freely removed from the upper case 1 and the battery 3 can also be easily removed from the battery containing chamber.

The operation force of the operating knob 4e depends on the tension of the tension coil spring 8, but this strength does not directly affect the force which causes the battery lid to be held by the apparatus body and therefore, if this is set to a weaker level, the battery lid will become readily mountable and dismountable.

Figure 2:
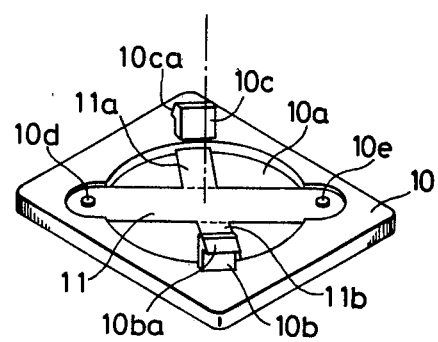
FIG. 2 is a perspective view of another embodiment of the present invention.

FIG. 7 shows another embodiment of the present invention in which the battery lid 10 is provided with a resilient member for urging the battery. In FIG. 2, reference numeral 11 designates a sheet-like resilient member formed of a metal and fixed to two bosses 10d and 10e provided on the back of the battery lid 10. Two arms 11a and 11b extend angularly from the base of the resilient member. When the battery lid 10 is brought into engagement with the upper case 1, these arms 11a and 11b urge the button type battery 3 and flex to create a resilient force which forces the button type battery 3 toward the ⊖ side circuit pattern formed on the printed wiring substrate. This enables stable electrical connection to be accomplished. When the battery is to be removed, the operating knob 4e may be simply shifted to cause the battery lid to jump up automatically from the upper case 1 with the aid of the repulsive force of the arms 11a and 11b of the sheet-like resilient member 11, whereby the battery lid 10 can be easily removed.

What I claim is:

1. A battery containing mechanism of a compact electronic instrument comprising:
    a battery containing chamber provided with an opening for inserting a battery therethrough and provided with a contact for connection with an electrode of the battery;
    a pivotable member pivotably held on a side of the opening of said battery containing chamber and biased in a predetermined direction by a spring member; and
    a battery lid restrained by said pivotable member to close the opening of said battery containing chamber and to fix the battery in said battery containing chamber.

2. A battery containing mechanism according to claim 1, wherein said pivotable member is a plurality of pivotable levers disposed on the opposite sides of said battery containing chamber and pivotable while being interlocked with each other.

3. A battery containing mechanism according to claim 1, wherein said battery lid has a projected portion having an inclined surface for causing said pivotable member to pivot in a direction opposite to the predetermined direction against the force of the spring member and for engaging the pivotable member.

4. A battery containing mechanism of a compact electronic instrument comprising:
- a base having a through-hole substantially shaped like a battery;
- a printed wiring substrate disposed on one side of said base for closing one face of the through-hole and having a battery contact portion facing the through-hole;
- a pivotable member pivotably held by said base and biased in a predetermined direction by a spring member; and
- a battery lid engaged with said pivotable member and fixed to said base for closing the other face of the through-hole.

5. A battery containing mechanism according to claim 4, wherein said pivotable member is a plurality of lever members pivotable while being interlocked with each other.

6. A battery containing mechanism according to claim 4, wherein said battery lid has an engaging projected portion having an inclined surface for causing said pivotable member to pivot in a direction opposite to the predetermined direction against the force of said spring member when it engages said pivotable member.

7. A battery containing mechanism according to claim 6, wherein said pivotable member has a pawl portion having an inclined surface substantially parallel to the inclined surface of said projected portion and engaging said projected portion.

8. A battery containing mechanism according to claim 4, wherein said battery lid has a resilient member for urging the battery against said printed wiring substrate.

9. A battery containing mechanism according to claim 4, further comprising a spring contact for urging the battery against a wall surface of the through-hole of said base.

10. A battery containing mechanism according to claim 4, wherein a part of said base which faces the through-hole is formed more thinly than the other part, said pivotable member is held on said thin part and the side surface of the battery is held down by said thin part and said pivotable member.

* * * * *